United States Patent
Guyette et al.

(10) Patent No.: US 9,173,337 B2
(45) Date of Patent: *Nov. 3, 2015

(54) GNSS OPTIMIZED CONTROL SYSTEM AND METHOD

(71) Applicant: AgJunction LLC, Hiawatha, KS (US)

(72) Inventors: Greg S. Guyette, Tempe, AZ (US);
Jeffrey Allen Dearborn, Southaven, MS (US)

(73) Assignee: EFC SYSTEMS, Inc., Brentwood, TN (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/043,741

(22) Filed: Oct. 1, 2013

(65) Prior Publication Data

US 2014/0032020 A1   Jan. 30, 2014

Related U.S. Application Data (63) Continuation-in-part of application No. 12/907,792, filed on Oct. 19, 2010, now Pat. No. 8,548,649, which is a continuation-in-part of application No. 14/011,347, filed on Aug. 27, 2013, now Pat. No.

(Continued)

(51) Int. Cl.
*B05B 12/00*   (2006.01)
*A01B 79/00*   (2006.01)
(Continued)

(52) U.S. Cl.
CPC .............. *A01B 79/005* (2013.01); *G01S 19/14* (2013.01); *G01S 19/42* (2013.01); *G01S 19/54* (2013.01); *G05D 1/0202* (2013.01)

(58) Field of Classification Search
CPC ...... A01B 79/005; A01C 3/066; B60P 1/006; B65B 51/067
USPC .............. 701/3, 50; 239/1, 11, 171, 668, 672; 298/8 H; 460/114, 119; 56/10.1, 10.2 R, 56/228; 111/170, 200, 171, 93
See application file for complete search history.

(56) References Cited

U.S. PATENT DOCUMENTS 5,021,792 A   6/1991   Hwang
5,404,661 A   4/1995   Sahm et al.
(Continued)

FOREIGN PATENT DOCUMENTS

WO   2009126587   10/2009

OTHER PUBLICATIONS

"Extended European Search Report", Appln. No. 10751234.5, Jul. 19, 2012.

(Continued)

*Primary Examiner* — Dalena Tran
(74) *Attorney, Agent, or Firm* — Law Office of Mark Brown, LLC; Mark E. Brown; Christopher M. DeBacker (57) ABSTRACT

A GNSS system in combination with a hydraulically-actuated, airborne dispenser for a dry material crop dusting system to optimize the distribution of dry materials over a particular tract of land. A GNSS subsystem is included using at least one GNSS antenna and one GNSS receiver located on the aircraft. The aircraft is equipped with an electronic/hydraulic crop dusting subsystem connected to a GNSS CPU. The GNSS ranging signals received by the antennas are processed by a receiver and processor system for determining the vehicle's position and dynamic attitude in three dimensions (3D). The system is adapted for operation in a differential GNSS (DGNSS) mode utilizing a base station at a fixed location.

1 Claim, 9 Drawing Sheets

Related U.S. Application Data 8,897,973, which is a continuation of application No. 13/117,794, filed on May 27, 2011, now Pat. No. 8,521,372.

(60) Provisional application No. 61/252,994, filed on Oct. 19, 2009, provisional application No. 61/349,703, filed on May 28, 2010, provisional application No. 61/349,707, filed on May 28, 2010, provisional application No. 61/349,695, filed on May 28, 2010.

(51) Int. Cl.
*G01S 19/14* (2010.01)
*G01S 19/42* (2010.01)
*G01S 19/54* (2010.01)
*G05D 1/02* (2006.01)

(56) References Cited

U.S. PATENT DOCUMENTS

| | | | |
|---|---|---|---|
| 5,430,654 | A | 7/1995 | Kyrtsos et al. |
| 5,612,864 | A | 3/1997 | Henderson |
| 5,646,844 | A | 7/1997 | Gudat et al. |
| 5,739,785 | A | 4/1998 | Allison et al. |
| 6,016,713 | A | 1/2000 | Hale |
| 6,044,324 | A | 3/2000 | Boerhave et al. |
| 6,087,984 | A | 7/2000 | Keller et al. |
| 6,304,210 | B1 | 10/2001 | Allison et al. |
| 6,313,788 | B1 | 11/2001 | Wilson |
| 6,324,473 | B1 | 11/2001 | Eschenbach |
| 6,336,066 | B1 | 1/2002 | Pellenc et al. |
| 6,380,888 | B1 | 4/2002 | Kucik |
| 6,401,041 | B1 | 6/2002 | Peterson |
| 6,449,558 | B1 | 9/2002 | Small |
| 6,515,619 | B1 | 2/2003 | McKay, Jr. |
| 6,701,239 | B2 | 3/2004 | Keefer |
| 6,959,245 | B2 | 10/2005 | Rooney et al. |
| 7,110,762 | B1 | 9/2006 | Cameron et al. |
| 7,254,485 | B2 | 8/2007 | Rooney et al. |
| 7,574,821 | B2 * | 8/2009 | Furem .............. 37/348 |
| 7,908,062 | B2 | 3/2011 | Corcoran |
| 8,018,376 | B2 | 9/2011 | McClure et al. |
| 8,081,987 | B2 | 12/2011 | Manson et al. |
| 8,140,223 | B2 | 3/2012 | Whitehead et al. |
| 8,214,738 | B2 | 7/2012 | Othmer et al. |
| 8,219,925 | B2 | 7/2012 | Othmer et al. |
| 8,219,926 | B2 | 7/2012 | Othmer |
| 8,260,485 | B1 | 9/2012 | Meuth et al. |
| 8,521,372 | B2 | 8/2013 | Hunt et al. |
| 8,548,649 | B2 | 10/2013 | Guyette et al. |
| 8,639,416 | B2 | 1/2014 | Jones et al. |
| 2002/0035431 | A1 | 3/2002 | Ell |
| 2002/0107609 | A1 | 8/2002 | Benneweis |
| 2003/0187560 | A1 | 10/2003 | Keller et al. |
| 2003/0195008 | A1 | 10/2003 | Mohi et al. |
| 2004/0212533 | A1 | 10/2004 | Whitehead et al. |
| 2005/0043882 | A1 | 2/2005 | Takazawa |
| 2005/0060069 | A1 | 3/2005 | Breed et al. |
| 2008/0282583 | A1 * | 11/2008 | Koellner et al. .............. 37/348 |
| 2009/0099737 | A1 | 4/2009 | Wendte et al. |
| 2009/0261987 | A1 | 10/2009 | Sun |
| 2009/0262974 | A1 | 10/2009 | Lithopoulos |
| 2010/0277365 | A1 | 11/2010 | Ha et al. |
| 2010/0286907 | A1 | 11/2010 | Hilbrandie et al. |
| 2011/0264307 | A1 | 10/2011 | Guyette et al. |
| 2011/0285587 | A1 | 11/2011 | Vollath et al. |
| 2011/0295500 | A1 | 12/2011 | Hunt et al. |
| 2012/0001928 | A1 | 1/2012 | Sheha et al. |
| 2012/0004845 | A1 | 1/2012 | Kmiecik et al. |
| 2012/0078493 | A1 | 3/2012 | Schunder et al. |
| 2012/0086598 | A1 | 4/2012 | Aghili |
| 2012/0139784 | A1 | 6/2012 | Ashjaee et al. |
| 2012/0154214 | A1 | 6/2012 | Leandro |
| 2012/0154215 | A1 | 6/2012 | Vollath et al. |
| 2012/0162014 | A1 | 6/2012 | Wu et al. |
| 2012/0320203 | A1 | 12/2012 | Liu |
| 2013/0027245 | A1 | 1/2013 | Lennen |
| 2013/0069821 | A1 | 3/2013 | Jambulimgam et al. |
| 2013/0069822 | A1 | 3/2013 | Wu et al. |
| 2013/0124055 | A1 | 5/2013 | Baurer et al. |
| 2013/0211717 | A1 | 8/2013 | Abts |
| 2014/0025289 | A1 | 1/2014 | Schunder et al. |

OTHER PUBLICATIONS

"International Search Report and Written Opinion", PCT/US2014/058659, Mar. 3, 2015.

* cited by examiner

GNSS OPTIMIZED CONTROL SYSTEM AND METHOD

CROSS-REFERENCE TO RELATED APPLICATION

This application is a continuation-in-part of and claims the benefit of U.S. patent application Ser. No. 12/907,792, entitled "GNSS OPTIMIZED AIRCRAFT CONTROL SYSTEM AND METHOD," filed Oct. 19, 2010, now U.S. Pat. No. 8,548,649, issued Oct. 1, 2013, which is related to and claims priority in U.S. Provisional Patent Application Ser. No. 61/252,994, filed Oct. 19, 2009; and is a continuation-in-part of and claims the benefit of U.S. patent application Ser. No. 14/011,347, entitled "SYSTEM AND METHOD FOR COLLECTING AND PROCESSING AGRICULTURAL FIELD DATA," filed Aug. 27, 2013, which is a continuation of and claims the benefit of U.S. patent application Ser. No. 13/117,794, entitled "SYSTEM AND METHOD FOR COLLECTING AND PROCESSING AGRICULTURAL FIELD DATA," filed May 27, 2011, now U.S. Pat. No. 8,521,372, issued Aug. 27, 2013, which claims the benefit of U.S. Provisional Patent Application No. 61/349,703, entitled "SYSTEM AND METHOD FOR COLLECTING AND PROCESSING AGRICULTURAL FIELD DATA," filed May 28, 2010, U.S. Provisional Patent Application No. 61/349,707, entitled "REMOTE MANAGEMENT SYSTEM FOR EQUIPMENT," filed May 28, 2010, and U.S. Provisional Patent Application No. 61/349,695, entitled "SYSTEM AND METHOD FOR WORKORDER MANAGEMENT," filed May 28, 2010, which applications are hereby incorporated by reference in their entirety.

BACKGROUND OF THE INVENTION

1. Field of the Invention

The present invention relates generally to aircraft guidance and control with differential global navigation satellite systems (DGNSSs), and in particular to a DGNSS-based system and method for optimizing crop dusting with dry materials.

2. Description of the Related Art

GNSS guidance and control are widely used for vehicle and personal navigation and a variety of other uses involving precision location in geodesic reference systems. GNSS, which includes the Global Positioning System (GPS) and other satellite-based positioning systems, can achieve greater accuracy with known correction techniques, including a number of commercial satellite based augmentation systems (SBASs).

Aircraft are often used to spray and dust croplands, forests and other land areas with chemicals, fertilizers, seeds, water, fire suppressants and other materials. These materials may be liquid or solid. An important objective in spraying and dusting crops and in aerial firefighting is even coverage without gaps or overlaps. Another major objective is avoiding exclusion areas, which can be located internally within a field or forest being treated, or externally beyond its borders. Dry materials are typically dropped from fixed and rotary wing aircraft using spreaders. These spreaders clamp to a gate box at the base of a hopper located inside of the fuselage. As the gate box is opened, material flows from the hopper into the spreader and is pushed out behind the aircraft by air passing through the spreader. Historically these systems had to be operated manually, but methods now exist that will allow these systems to operate electronically and/or hydraulically via switches in the cockpit. However, precise distribution control presents challenges with existing equipment.

Aircraft can use venturi spreaders to distribute seed, dusting material, and other chemicals. Venturi spreaders clamp to a gate box at the base of a hopper. As the adjustable door of the gate box opens, seeds, chemicals and other materials from the hopper fall into the venturi spreader and airflow through the spreader distributes it. The amount the door is opened determines the material flow rate. Optional agitators to help material exit the hopper and gate box assembly can also be included.

Ideally the material being dropped from the aircraft will entirely cover the property being targeted while avoiding exclusion areas. However, factors such as the altitude of the aircraft, the ground speed of the aircraft, temperature, humidity, moisture content of the material and ambient wind speed and direction can affect the results. Flying too high or too low can distort the swath of the spread and result in misapplication of the material. Guidance systems, such as DGNSS, combined with electronic controllers for the spreading equipment, can optimize crop dusting.

Aerial photography, videography, surveying and telemetry procedures commonly require accurate navigation and aircraft locating equipment and methods in order to achieve optimum results. Flight guidance has also been automated with autopilots, automatic landing systems, navionics and other equipment. Such procedures can benefit from accurate GNSS-based control systems and methods.

DGNSS can utilize satellite based augmentation systems (SBAS), including the Wide Area Augmentation System (WAAS) (U.S.), and similar systems such as EGNOS (European Union) and MSAS (Japan). When accomplished with two or more antennas at a fixed spacing, an angular rotation may be computed using the position differences. In an exemplary embodiment, two antennas placed in the horizontal plane may be employed to compute a heading (rotation about a vertical axis) from a position displacement. Heading information, combined with position, provides the feedback information desired for a proper control of the vehicle direction.

Another benefit achieved by incorporating a GNSS-based heading sensor is the elimination or reduction of drift and biases resultant from a gyro-only or other inertial sensor approach. Yet another advantage is that heading may be computed while movable equipment is stopped or moving slowly, which is not possible in a single-antenna, GNSS-based approach that requires a velocity vector to derive a heading. Yet another advantage of incorporating a GNSS-based heading sensor is independence from a host vehicle's sensors or additional external sensors. Thus, such a system is readily maintained as equipment-independent and may be moved from one vehicle to another with minimal effort.

An example of a GNSS is the Global Positioning System (GPS) established by the United States government, which employs a constellation of 24 or more satellites in well-defined orbits at an altitude of approximately 26,500 km. These satellites continuously transmit microwave L-band radio signals in two frequency bands, centered at 1575.42 MHz and 1227.6 MHz, denoted as L1 and L2 respectively. These signals include timing patterns relative to the satellite's onboard precision clock (which is kept synchronized by a ground station) as well as a navigation message giving the precise orbital positions of the satellites, an ionosphere model and other useful information. GPS receivers process the radio signals, computing ranges to the GPS satellites, and by triangulating these ranges, the GPS receiver determines its position and its internal clock error.

In standalone GPS systems that determine a receiver's antenna position coordinates without reference to a nearby reference receiver, the process of position determination is subject to errors from a number of sources. These include errors in the GPS satellite's clock reference, the location of the orbiting satellite, ionosphere-induced propagation delay errors, and troposphere refraction errors.

To overcome these positioning errors of standalone GPS systems, GPS applications have been improved and enhanced by employing a broader array of satellites such as GNSS and WAAS. For example, see commonly assigned U.S. Pat. No. 6,469,663 to Whitehead et al. titled Method and System for GPS and WAAS Carrier Phase Measurements for Relative Positioning, dated Oct. 22, 2002, the disclosures of which are incorporated by reference herein in their entirety. Additionally, multiple receiver DGPS has been enhanced by utilizing a single receiver to perform differential corrections. For example, see commonly assigned U.S. Pat. No. 6,397,147 to Whitehead titled Relative GPS Positioning Using A Single GPS Receiver With Internally Generated Differential Correction Terms, dated May 28, 2002, the disclosures of which are incorporated by reference herein in their entirety.

Heretofore there has not been available a GNSS system and method for guiding aircraft to optimize various procedures, including the spreading of solid material accurately on a predetermined area within relatively precise boundaries while avoiding exclusion areas with the advantages and features of the present invention.

SUMMARY OF THE INVENTION

In practice, an exemplary embodiment of the present invention uses a GNSS system(s) in combination with a hydraulically-actuated, airborne dispenser for a dry material crop dusting system to optimize the distribution of dry materials over a particular tract of land. The system is applicable to agriculture, but is not limited to that purpose. The system includes a GNSS subsystem with at least one GNSS antenna and one GNSS receiver located on the aircraft. The system also includes an electronic/hydraulic crop dusting subsystem connected to the GNSS. The GNSS ranging signals received by the antennas are processed by a receiver and processor system for determining the vehicle's position and dynamic attitude in three dimensions (3D). A graphical user interface (GUI) placed in the vehicle will give the driver a real-time view of his or her current bearing as well as a calculated "optimal path" based on calculations and variable data, such as wind speed and direction, material moisture content, altitude, air speed and other conditions.

Information that GNSS can provide to the pilot of an aircraft includes not only the current position, but extends to providing the pilot with knowledge of the ideal flight path to provide relatively even distribution of dry material over the desired tract of land. An integrated system will use the GNSS system to control the gate box of the hydraulic crop dusting system. The GNSS guidance system will recognize the ideal time to open or close the gate, how far to open the gate and how much to alter the gate opening during flight based on fluctuations in ground speed. The gate positions can also change automatically based on data entered into a pre-designed map of varying rates. The opening and changing of gate positions are intended to achieve a continual optimal desired output while the guidance system is ensuring an even distribution of the dry material. Other exemplary embodiments include an aerial camera for photography or videography, a telemetry device, a laser altimeter and components, including software, for aerial mapping and surveying. Automatic and assisted landing functions can be accomplished with the DGNSS-based control system supplemented with the laser altimeter.

An ideal function of the present invention is to gather information using an aircraft and a dry gate device and to save this information into a profile to be used during later dusting/spreading sessions over the same piece of land. This profile information will be used to calibrate a gate box assembly and control system as well as the GNSS guidance system. Information stored in the profile will include gate box metering data, GNSS flight path data, and visual imaging or telemetry data gathered by an included camera and/or telemetry device. A crop dusting control system aspect of the present invention includes a GNSS subsystem connected to a controller and providing georeference guidance and positioning, and a bulk material dispensing subsystem connected to the controller and selectively and variably discharging dry material with real-time feedback signals indicating actual discharge rates. A tracking aspect of the present invention uses GNSS with the vehicle controller for tracking An imagery aspect of the present invention uses pre-existing or new, real-time images captured by an onboard camera device and precisely matched with georeference coordinates. A comprehensive system for GNSS-controlling vehicle navigation and material discharge flow control comprises another aspect of the present invention and uses various sensors as input devices and actuators.

BRIEF DESCRIPTION OF THE DRAWINGS

The drawings constitute a part of this specification and include exemplary embodiments of the present invention and illustrate various objects and features thereof.

FIG. 1A is an isometric view of a crop-dusting aircraft showing conventional X, Y and Z axes corresponding to roll, pitch and yaw rotation.

FIG. 1B is a schematic diagram of an airborne flow control system using DGNSS embodying an aspect of the invention in a crop dusting aircraft.

FIG. 2 is a block diagram of the control system in an airborne solid material crop dusting distribution system.

FIG. 3 is an isometric view of a venturi spreader and a dry materials hopper, which are installed in the crop dusting aircraft.

FIG. 4 is an isometric view of the aircraft, particularly showing the material distributing components of the flow control and spreader system and the hydraulic subsystem.

FIG. 5 is a block diagram of the electronic control components of the flow control and spreader system and their connection with the DGNSS rover system.

FIG. 6 is a top plan view of the crop-dusting aircraft in operation applying material to a field by overflying a coverage pattern consisting of parallel swaths.

FIG. 7 is a block diagram of a crop dusting control system comprising an alternative embodiment of the present invention, including a sub-tank within a primary tank.

FIG. 8 is a diagram of an aircraft control system comprising an alternative embodiment of the present invention and including a laser altimeter.

DETAILED DESCRIPTION OF THE PREFERRED EMBODIMENTS

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Global navigation satellite systems (GNSSs) are broadly defined to include GPS (U.S.), Galileo (Europe, proposed), GLONASS (Russia), Beidou/Compass (China, proposed), IRNSS (India, proposed), QZSS (Japan, proposed) and other current and future positioning technology using signals from satellites, with or without augmentation from SBAS or terrestrial reference correction sources. Inertial navigation systems (INS) include gyroscopic (gyro) sensors, accelerometers and similar technologies for providing output corresponding to the inertia of moving components in all axes, i.e. through six degrees of freedom (positive and negative directions along longitudinal X, transverse Y and vertical Z axes). Yaw, pitch and roll refer to moving component rotation about the Z, Y and X axes respectively. Said terminology will include the words specifically mentioned, derivatives thereof and words of similar meaning.

Disclosed herein in an exemplary embodiment is a sensor system for vehicle control and guidance. The sensor system utilizes at least one GNSS carrier phase differenced antenna to derive attitude information, herein referred to as a GNSS attitude system. Moreover, the GNSS attitude system may optionally be combined with one or more rate gyro(s) used to measure turn, roll or pitch rates and to further calibrate bias and scale factor errors within these gyros. In an exemplary embodiment, the rate gyros and the GNSS receiver/antenna are integrated together within the same unit, to provide multiple mechanisms to characterize a vehicle's motion and position to make a robust vehicle steering control mechanism.

Without limitation on the generality of useful applications of the present invention, an exemplary application of the DGNSS optimized crop dusting control system 2 (crop dusting system) comprises a crop dusting aircraft 4, the receiver unit 12, a master antenna 6 and optional slave antennas 8, 10, a gate box control unit 30 and a SBAS 7 such as WAAS. The rover receiver unit 12 is comprised of a clock 16, a central processing unit (CPU) 18, a GNSS graphical user interface (GUI) 20, a master rover receiver 14, an optional slave rover receiver 22, an antenna switch control 24, and an orientation device 26. The CPU 18 is electrically connected to the gate box control unit 30, which is comprised of a gate box controller 38 and a gate box control display 40. DGNSS accuracy is created by using SBAS 7 (e.g. WAAS) corrections in combination with the above-mentioned GNSS equipment. An optional camera/telemetry device 28 is connected to the CPU 18 and provides photography, videography and related optical and other telemetry functions, such as surveying topography and image capture for monitoring, recording and analyzing aerial procedures for direct georeferencing to 3-D digital models, such as the Google Earth model.

II. Crop Dusting Control System 2

The exemplary purpose of the present invention is to gather data while flying over a specific piece of land. Information to be gathered includes visual image data and/or telemetry data, flight path information based on GNSS data points, and the rate of dry material being dropped from a dry gate mechanism. This data will be saved to a profile based on the material used and the land being flown over. Additional data may be input into said profile from external data sources, such as the internet or manually by a programmer or end-user. The goal of this combination of data is to increase the accuracy of dropping material over a piece of land from an aircraft for agricultural or other purposes.

Referring to the drawings more detail, the reference numeral 2 generally designates the crop dusting control system. The crop dusting control system 2 is comprised generally of a crop-dusting aircraft 4, a GNSS-based aircraft control subsystem 9 and a gate box control system 11. The GNSS-based control subsystem is comprised of: antennas 6, 8, 10; additional flight instruments; the receiver unit 12; and the GUI 20. The gate box control system is comprised of a gate box control unit 30, an internal hopper 42, a gate box assembly 64, and a spreader 62.

Figure 1A:
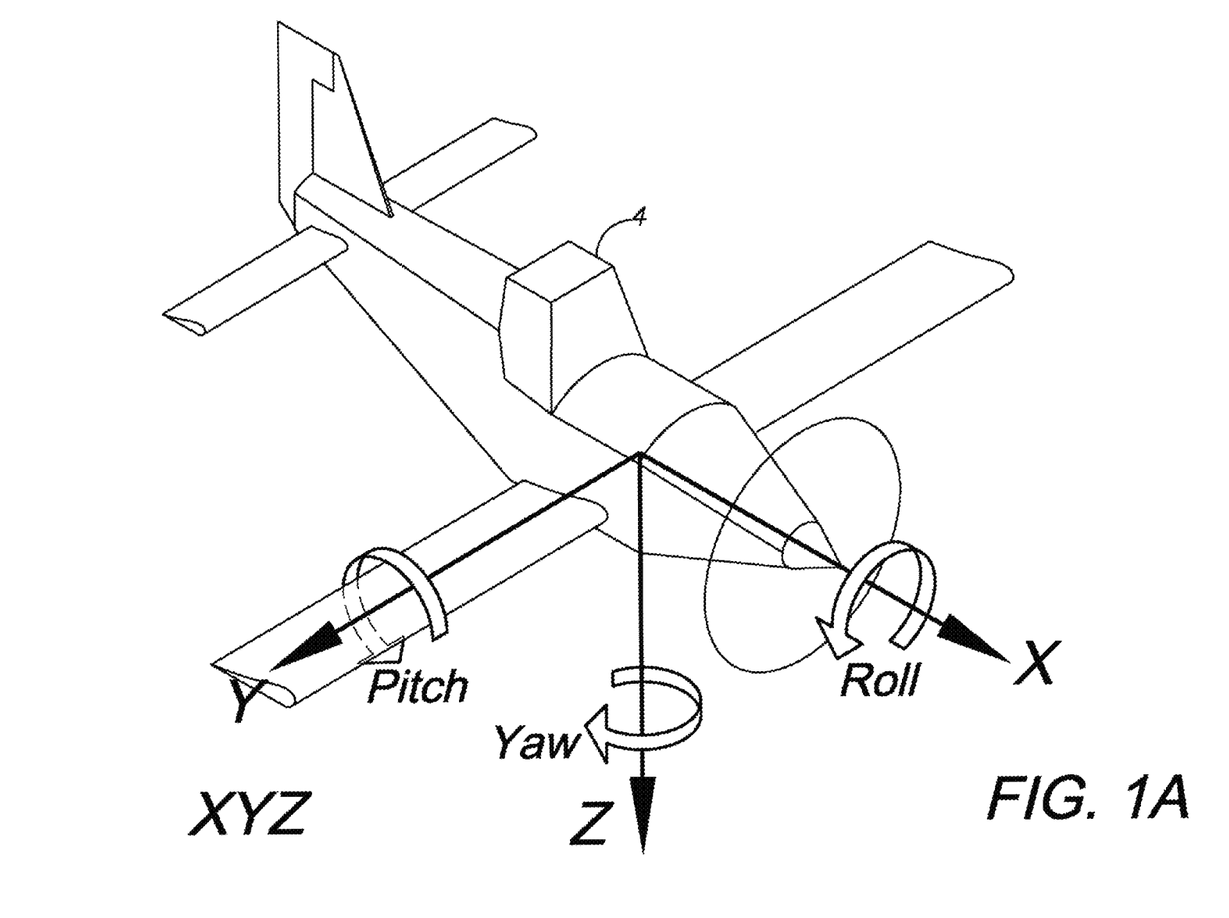

FIG. 1A represents an isometric view of a crop-dusting aircraft 4. Roll refers to an aircraft turning about the X-axis. Pitch refers to an aircraft turning about the Y-axis. Yaw refers to an aircraft turning about the Z axis. This is graphically displayed in FIG. 1 and these terms are used throughout in such a manner.

Figure 1B:
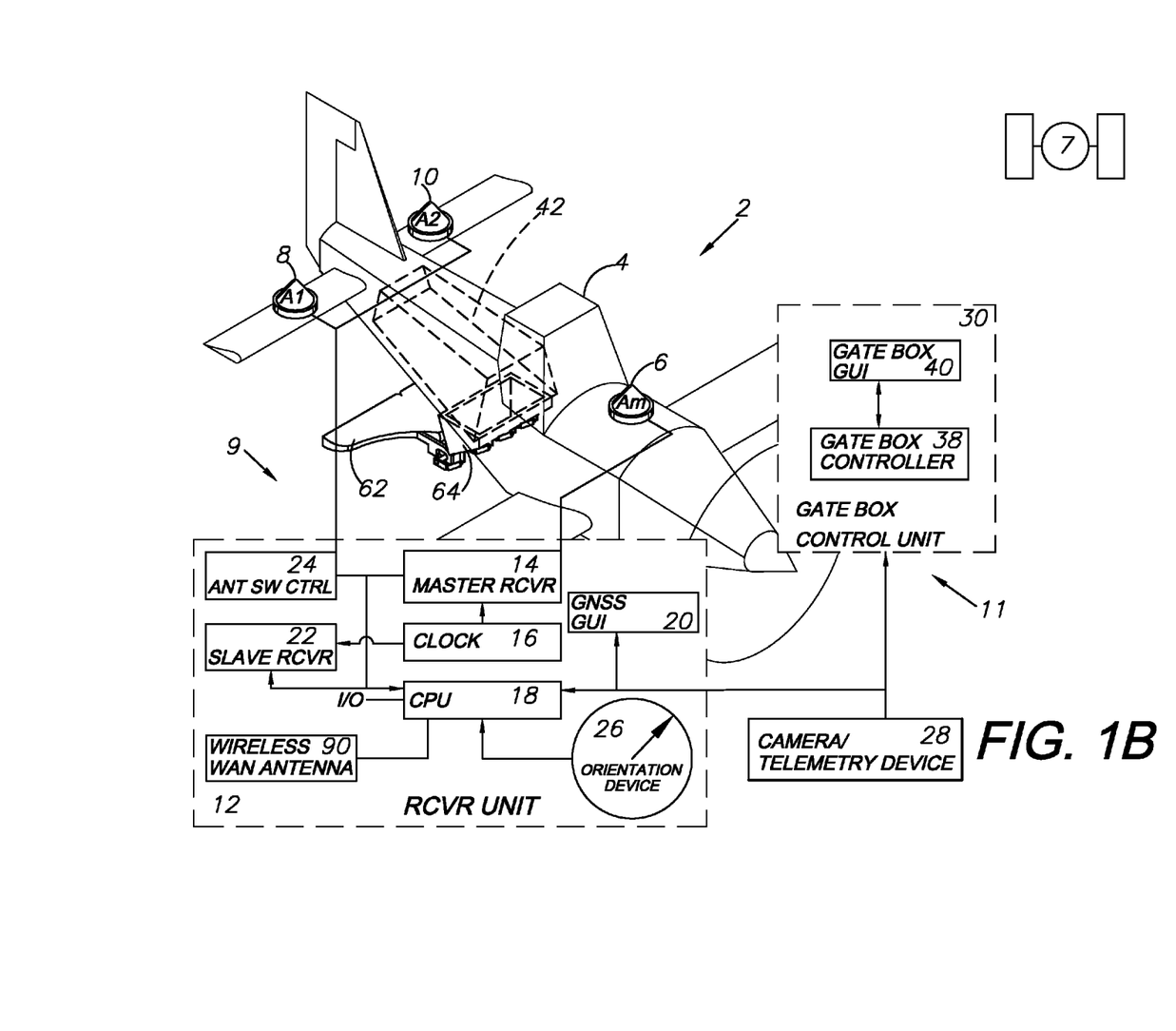
Figure 2:
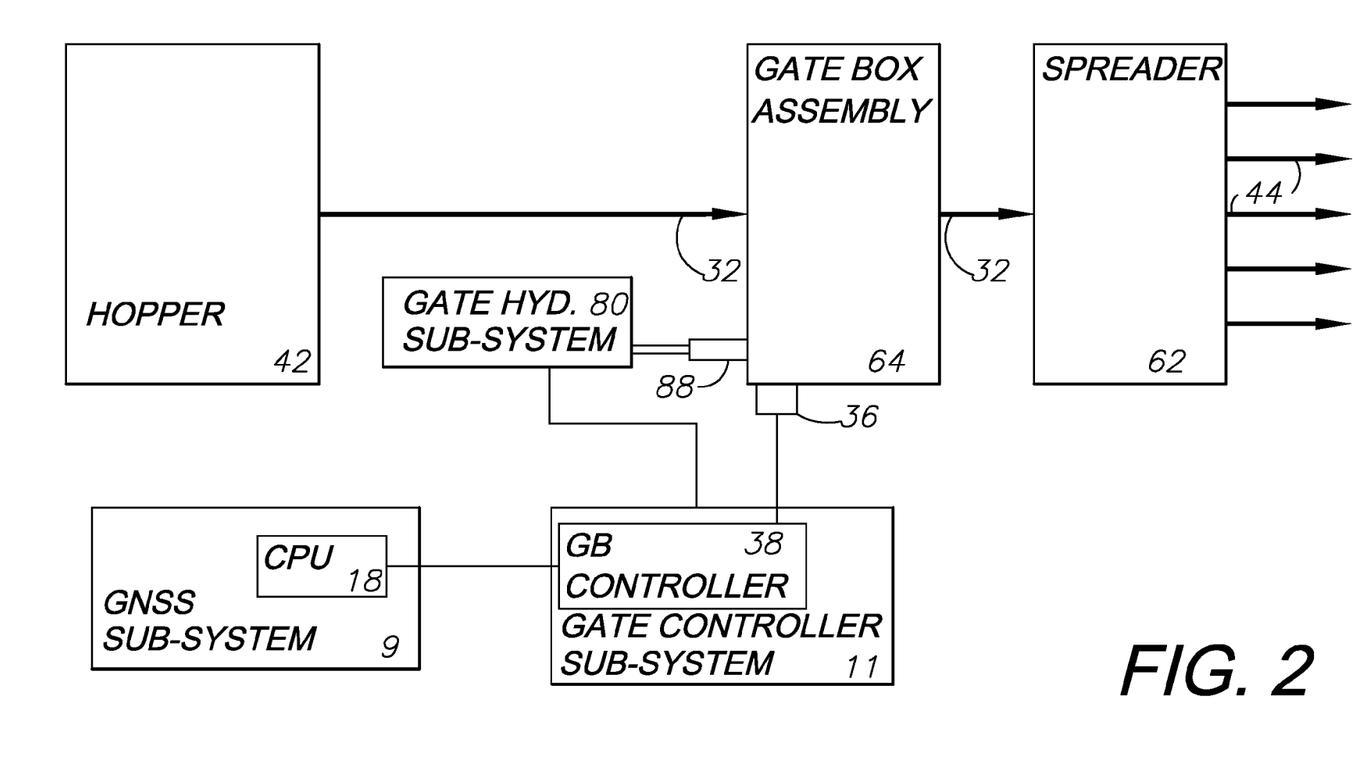

FIG. 1B represents a schematic diagram of a crop-dusting aircraft 4 and indicates the various elements of the crop dusting system 2, including the aircraft control subsystem 9 and the gate control subsystem 11.

The GNSS system is comprised of the external antennas and the internal components including a receiver unit 12. The master rover antenna 6 and the two optional slave antennas 8, 10 can be placed externally on the aircraft 4. The example shown in FIG. 1B displays the optional slave antennas 8, 10 located on the tail (e.g., horizontal stabilizer) of the aircraft 4 with the master antenna 6 located near the cockpit. This arrangement is exemplary only, and other arrangements of one or more antenna(s) may be implemented and connected to the receiver unit 12. Additional slave antennas may also be placed on the aircraft for increased accuracy and allow for the calculation of wind speed and direction. The various antennas receive satellite positional data, including each individual antenna's geo-reference DGNSS-determined location, and report this information to the rover receiver unit 12. Having more than one antenna on the aircraft allows more detailed positional information about the vehicle to be transmitted. With three antennas, a complete six-degrees-of-freedom vector 3D attitude solution can be determined by the GNSS positioning system, allowing the system to track the yaw, pitch, and roll of the aircraft. Suitable receiver units are available from Hemisphere GPS, LLC of Calgary, Alberta, Canada and Scottsdale, Ariz., and can be based on Crescent single frequency or Eclipse dual frequency receiver technology.

The master rover receiver 14 and the optional slave rover receiver 22 receive positional data from at least one antenna 6, 8, 10 on the aircraft, as well as from an SBAS 7. As stated above regarding the slave antennas, the slave receiver 22 is an optional device that increases the positional accuracy of the entire system. The CPU 18 processes all information received by the master and slave rover receivers 14, 22 and compiles this data with information it may receive from other optional flight instruments. Through a combination of the clock 16, CPU 18, the orientation device 26, and other optional flight instruments, information is displayed to the pilot through the GUI 20 located in the cockpit of the aircraft 4. The GUI 20 provides information to the pilot graphically and allows the pilot to input commands directly into the GUI 20, which are read and processed by the CPU 18. Commands entered by the pilot are communicated to the crop dusting system 2 through the CPU 18. The system also contains the antenna switch control 24, which enables switching among the antennas 6, 8, 10 for selective or sequenced input to the receivers 14, 22. The CPU 18 can be programmed for switching among the antennas 6, 8, 10 via the switch control 24. Also contained within the receiver unit 12 is a wide area network (WAN) antenna 90 which can access long-distance wireless WAN networks and connect the pilot to the internet.

Information displayed to the pilot on the GUI 20 will include the aircraft's dynamic operating characteristics such as current speed, altitude, heading, yaw, pitch, and roll. Additionally, the pre-programmed flight path over the selected tract of land will be displayed with the position of the aircraft 4 dynamically displayed in real-time, providing the pilot with a flight path that will produce optimal application of the dry crop dusting material. The GNSS system 9 will also notify the pilot when the aircraft 4 is deviating from the ideal path as calculated by the crop dusting system 2. Ideal speeds for making sweeping turns will also be displayed, giving the pilot an opportunity to anticipate each turn.

The WAN antenna 90 is able to connect to a nearby WAN or local area network (LAN). This connection to the internet will give the pilot (or driver in the case of adapting the present invention to a ground vehicle) internet capabilities which will allow the pilot to access specific websites containing recently updated photographs of the land to be dusted or surveyed. Information that can be gleaned from such a map includes field water data, the location of obstacles where dry material should not be spread, and other relevant data necessary for accurate and complete coverage of dry material.

Data generated by the various sub-systems of the aircraft can be automatically sent over the WAN from the local WAN antenna 90 to a computer on the ground via the internet. This information can then be used to track the aircraft as it currently flies, to determine where a past aircraft has flown, or simply to monitor the various sub-systems. The CPU 18 connects to said WAN antenna and provides any and all relevant data requested by the user on the ground regarding the various systems and sub-systems of the overall crop dusting control system 2.

The optional camera/telemetry device 28 can facilitate a variety of procedures and operations. For example, real-time video images of fields, forests and other fly-over land and marine images can be captured for processing by the CPU 18, thus providing visual records of operations. Such records can be uploaded to a server for further analysis and record-keeping. Aircraft equipped with the control system 2 can receive such photographic and geographic data for use in subsequent operations. For example, imagery can be made available for a next day's operations, or with even shorter turnaround. Such visual records can be matched with Google Earth data as mentioned below by an automatic geo-referencing process to generate pre-planned flight paths based on recent land data retrieved by fly-overs. Moreover, telemetry procedures such as topographical mapping, mineral surveying and other aerial operations can be facilitated with suitable RF, IR, optical, sonar, radar and other telemetry means.

Providing up-to-date visual data and accurate information about water and mineral data would be extremely important in the agricultural field. There is a need in the industry for updated visual field data quickly and often. With the internet connection allowed by the WAN antenna 90, an aircraft outfitted with the present invention can perform a fly-over of a particular piece of land and gather image data with the connected camera/telemetry device 28. These images can immediately be sent over the network to whomever requested those photos, and the user on the ground can compare the images and setup a pre-planned flight path on a ground computer. This flight path can then be sent to the pilot who will then perform a job of dusting the area chosen by the user on the ground. Optionally, unmanned aerial vehicles (UAVs) can be used to daily or weekly perform large-scale sweeping flights over varying areas of land to gather image data. This data can be uploaded to a server accessible on the internet whereby paid subscribers can retrieve relevant and up-to-date image data on their particular piece of land by entering in geo-reference information.

Even more simply, the camera or telemetry device 28 can be used to determine and account for altitude and wind drift calculations. Using simple image recognition the system can pick out a single point in an image and track its movement so as to determine aircraft altitude depending on how fast the tracked object moves through the frame. Determining the angle of movement relative to the orientation of the airplane can be used to determine cross wind. Combined with GNSS positional data, all positional information likely required by the CPU to calculate when and where dry material should be dropped onto a field should be readily available from the onboard equipment.

The gate control system 11 is comprised of the controller unit 30, the gate box assembly 64 and connected components. The gate box control unit 30 contains the electrical gate box controller 38 and the electrically connected gate box GUI 40. The gate box control display 40 is similar to the GNSS GUI 20 in that it displays graphically information related to the gate control unit 11 to the pilot. The pilot can optionally enter commands into the gate box control display 40 which will send signals to the gate box controller 38 to open or close the gate box assembly 64. It should be noted that a non-graphical user interface can be installed in place of the gate box GUI 40.

The gate box controller 38 is also electrically connected with the CPU 18, which is in constant communication with the GNSS-based control subsystem 9. This allows the CPU 18 to autonomously control the opening and closing of the gate box assembly 64 based on GNSS positional data. This combination of positional data, gate box control and a pre-planned flight path allows the pilot to optionally hand over all crop dusting control to the CPU while the pilot focuses on the task of flying the plane along the desired path. If the pilot wishes to regain manual control over the gate box assembly 64, the pilot interrupts the auto-control of the gate box controller 38 via the gate box GUI 40.

The gate control system 11 includes a "soft close" feature whereby the final closing of the gate box assembly 64 is controlled via a proportional-integral-derivative (PID) control feature or function and algorithm, which can be programmed into the gate box control unit 30 and/or the CPU 18. The PID soft close control is effective during the final portion of the gate closing motion and "softly" closed the gates just enough to prevent further material flow. In particular, the soft close control avoids "overclosing" the gates with greater force and movement than is necessary. Overclosing the gates tends to delay reopening because the actuator mechanism must overcome the greater force and the moving parts must travel further. Prompt system reactions upon crossing boundaries between different application rate zones are helpful in applying material.

The two displays, the GNSS GUI 20 and the gate controller display 40, are available to the pilot in the aircraft 4 cockpit and allow the pilot to make on-the-fly changes to the crop dusting system control 2, or to merely adjust the aircraft's course to maintain the calculated optimal course. The two displays are electrically connected to the gate controller 38 and the CPU 18, which are also electrically connected. Information sent to the gate controller 38 by the gate box control display 40 is also processed by the CPU 18 and stored in memory.

FIG. 2 shows a box diagram and the connections between the GNSS sub-system 9, the gate control sub-system 11, and the gate hydraulic sub-system 80. Electrical control signals are processed back and forth between the CPU 18 and the gate box controller 38, with each providing constant feedback to one another. An additional feedback loop exists between the gate box controller 38 and a gate box assembly sensor 36. The feedback mechanism shall be any suitable mechanism for the purposes of transmitting information from the sensor to the controller 38. The sensor 36 may be a mechanical sensor, an optical sensor, or any sensor suitable for determining the rate of flow of material exiting the gate box 64 at any time. The dry material path 32 exits the hopper and enters the gate box, which is controlled by the several other systems combined. As the gate box assembly 64 is opened or closed, material will exit the gate box at a faster or slower rate which will then be picked up by the sensor 36. This information is returned to the gate box controller 38 and in turn the CPU 18 and is stored as metering information to the profile of the present job.

Figure 3:
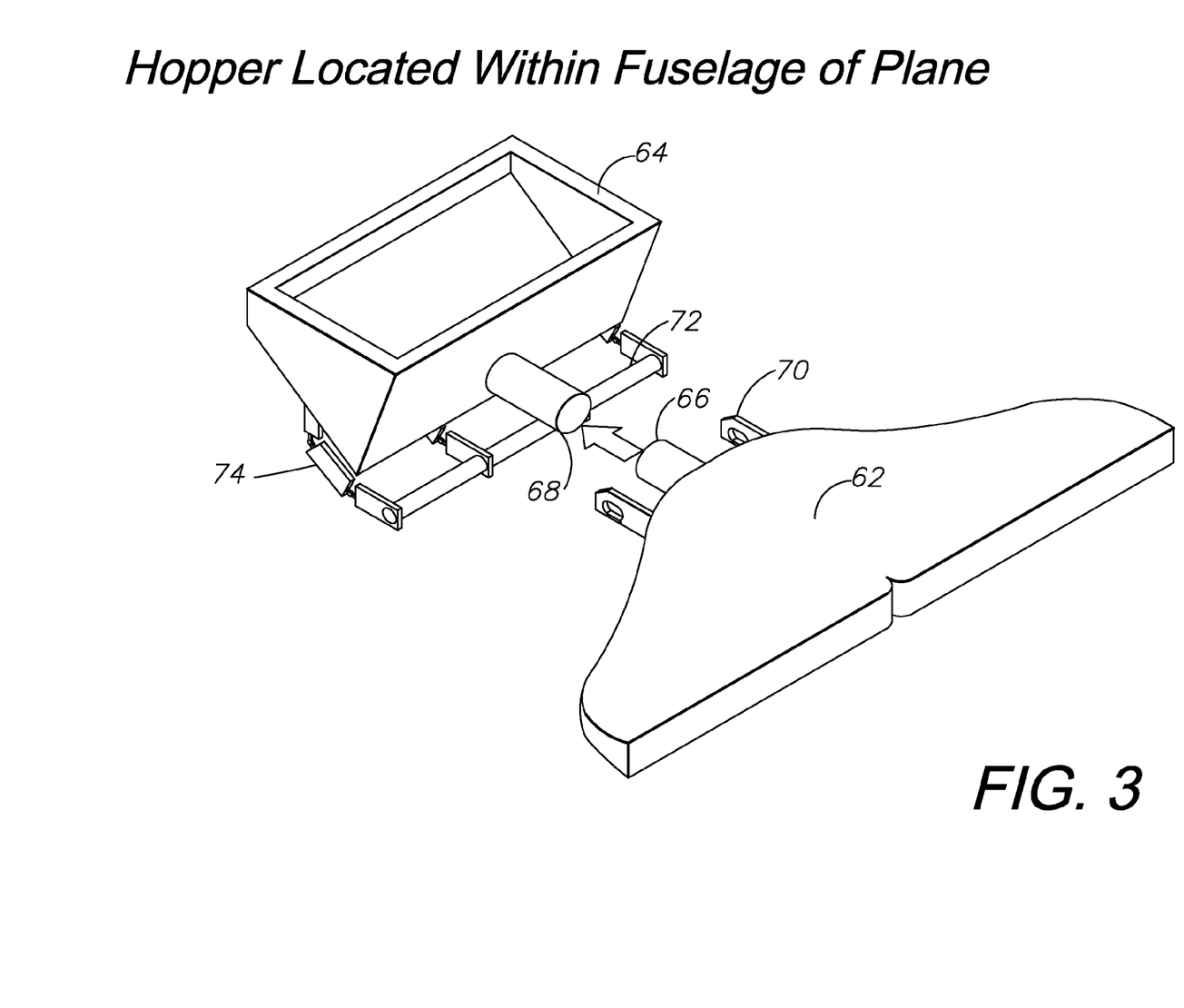

FIG. 3 displays the venturi spreader 62 and the gate box assembly 64 that attach to the aircraft 4. One example of such a spreader and gate box assembly combination is that manufactured by Transland Inc. of Wichita Falls, Tex. As an example, a typical Transland spreader 62 and gate box assembly 64 is further comprised of a spreader tubular connection 66, a gate box tubular connection 68, some variety of spreader latch arm 70, a gate box structural bar 72 and connected flexible arms 74. In one such variety of spreader and gate box combination, the spreader latch arms 70 or similar connecting devices connect to the gate box structural bar 72 a similar device. The flexible arms 74 in the present example allow the structural bar 72 to be positioned to accept a variety of spreaders 62.

Figure 4:
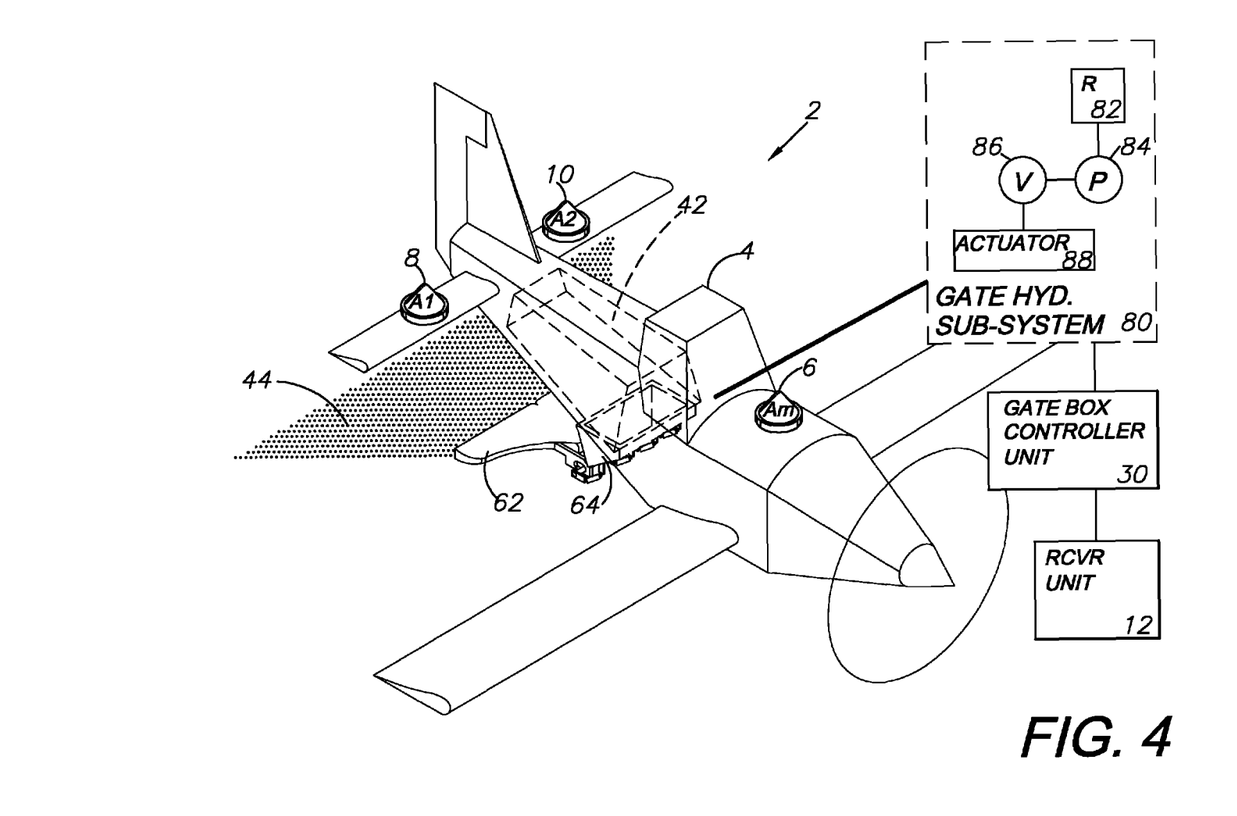

FIG. 4 shows the spreader 62 and the gate box assembly 64 mounted on the aircraft 4 and fed by the internal aircraft hopper 42, which can be filled with dry material 44 for spreading by the spreader 62. It should be noted that this material may not exit uniformly from the spreader as indicated. Depending on the wind conditions and the tilt of the aircraft 4, the material 44 may drift a significant amount in the wind. Knowing the aircraft's altitude, wind speed, and wind direction can help the CPU 18 calculate such material drift and adjust the flight path accordingly. The CPU 18 working with the gate box controller 38 could signal the controlling hopper valves to open or close early or late depending on the wind and altitude. Additionally, FIG. 4 shows the internal components of the hydraulic subsystem 80. The hydraulic subsystem 80 is further comprised of a hydraulic reservoir 82, a pump 84, a control valve 86 and an actuator 88. The hydraulic actuator 88 can comprise a piston-and-cylinder unit or a hydraulic motor. These components are controlled by the gate box controller 38. The hydraulic subsystem 80 actuates the gate box assembly 64. A hydraulic subsystem can be preferred over an electrical servo subsystem for speed and accuracy.

The internal hopper 42 supplies the dry material to the gate box assembly 64. The gate box assembly 64 is opened and closed using the above-mentioned hydraulic subsystem 80. As the gate opens, dry material exits the hopper 42 and enters the gate box assembly 64. Air passing through the spreader 62 pulls the dry material out of the spreader and the spread material 44 disburses evenly through the air as it falls on the ground below.

Figure 5:
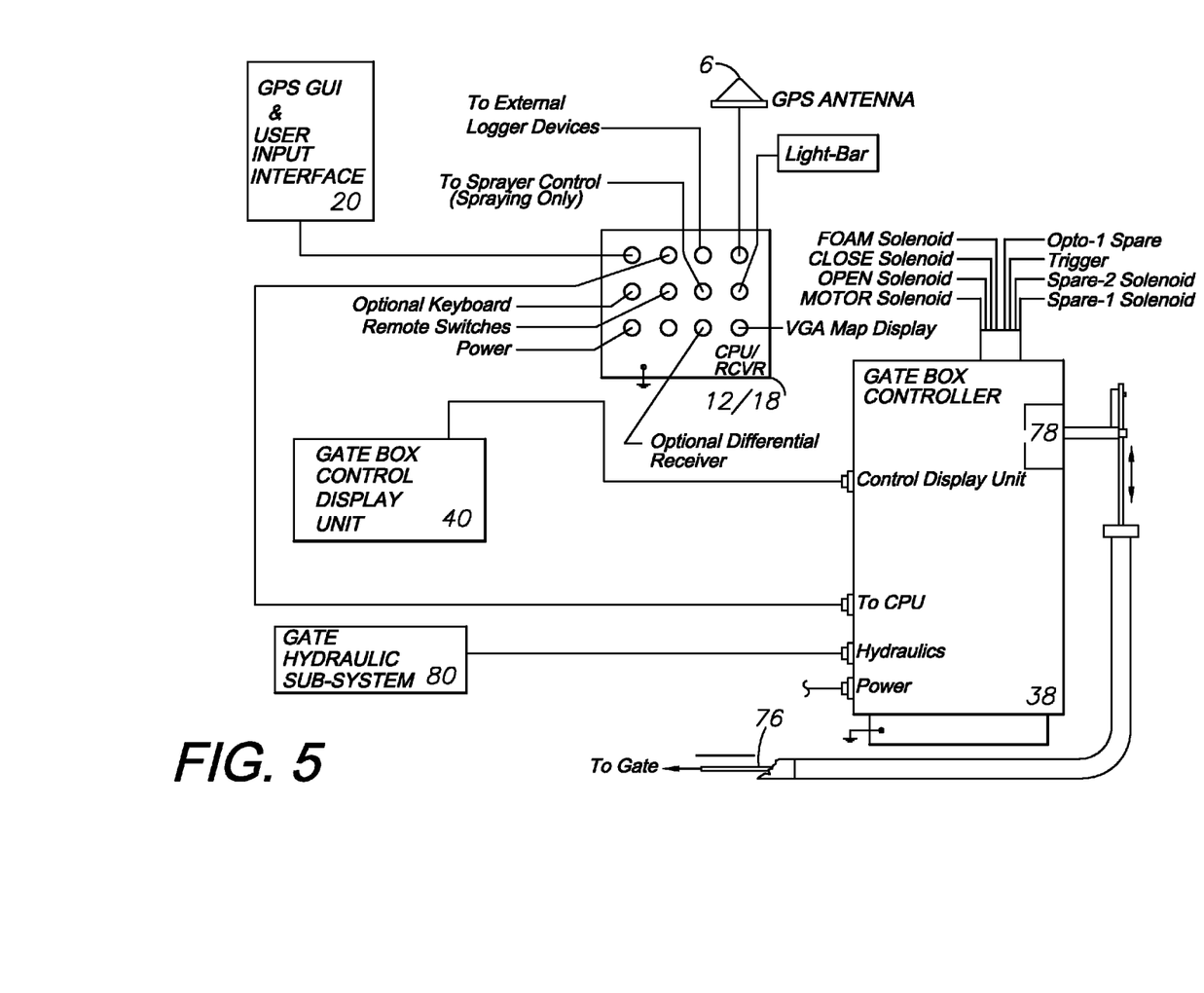

FIG. 5 is a block diagram of the crop dusting control system 2 showing the receiver unit 12 and the CPU 18 combined in a single unit 12/18, with appropriate I/O connections. FIG. 5 also shows the electrical, hydraulic and mechanical I/O connections for the gate box controller 38. An application of the present invention is to optimize the spread of dry material over a particular piece of land. The system 2 obtains DGNSS data from the rover receiver unit 12, processes all relevant data through its CPU 18, and determines when to open or close the gate box assembly 64, and by how much. The gate box controller 38 operates the gate box assembly 64.

The gate box controller 38 then communicates with the hydraulic subsystem 80 whereby the gate box assembly 64 is opened or closed. Feedback from the gate box assembly 64 is transmitted to the gate box controller 64 via a push/pull encoder cable 76, which is physically pushed or pulled as the gate moves, actuating an encoder 78 located within the gate box controller 64. The gate box controller 64 is calibrated to determine the gate position, and this information is transmitted to the CPU 18 for further analysis.

Figure 6:
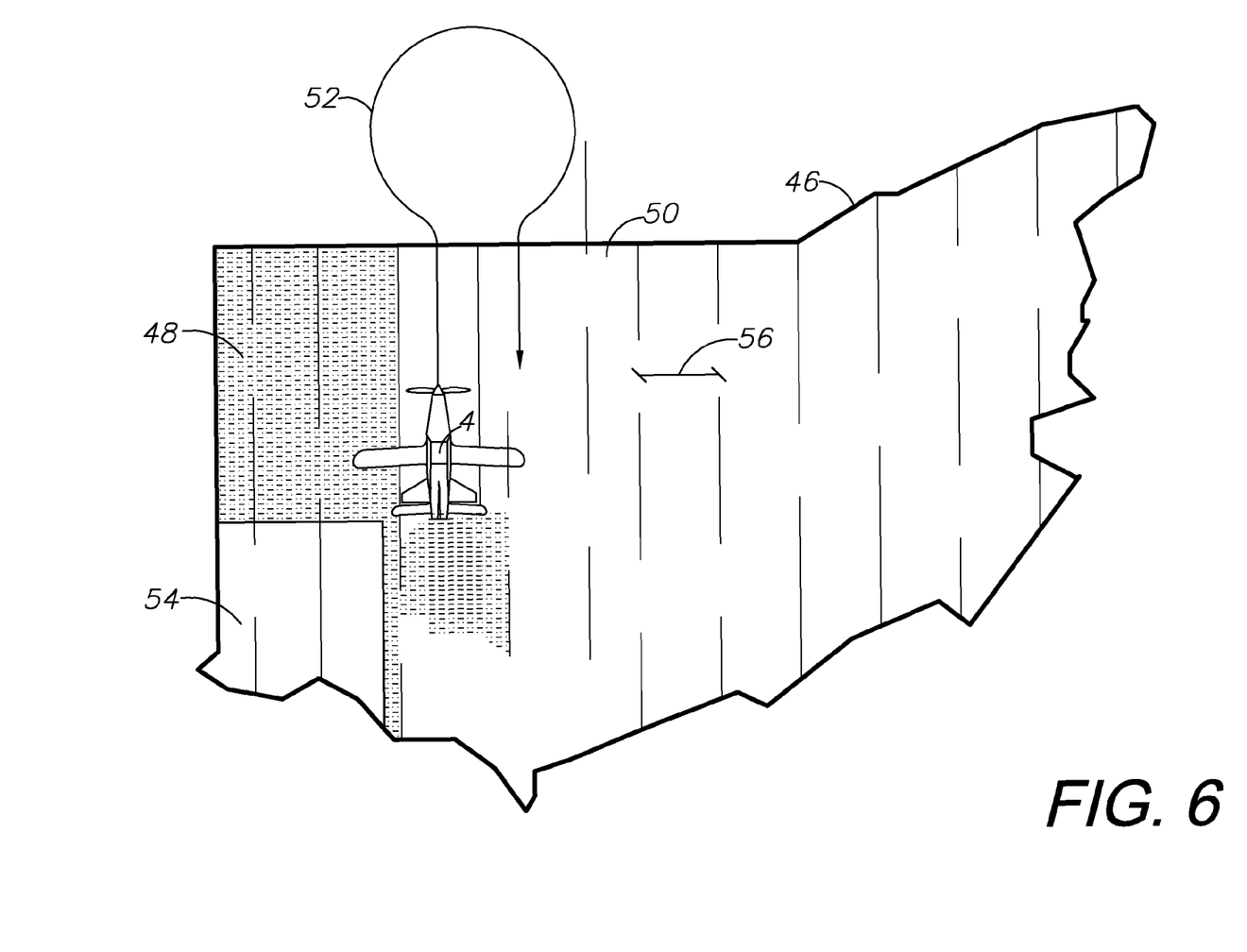
Figure 7:
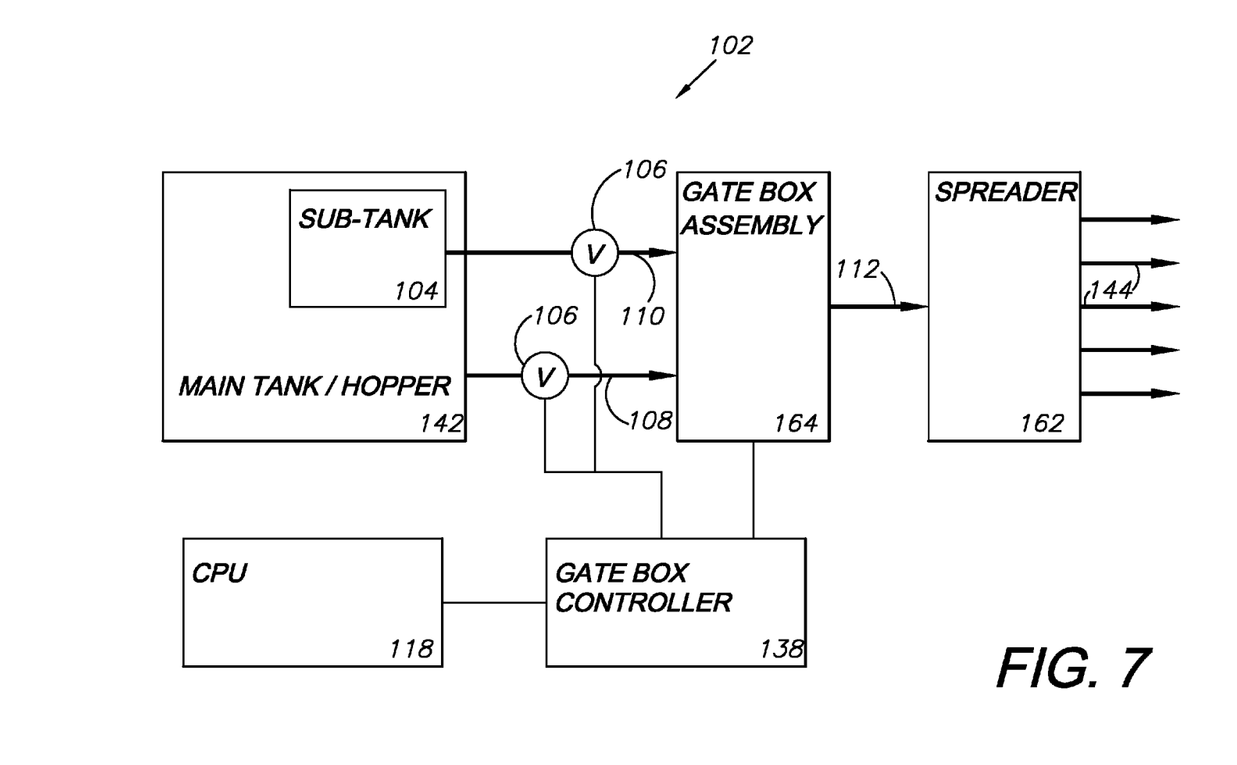
Figure 8:
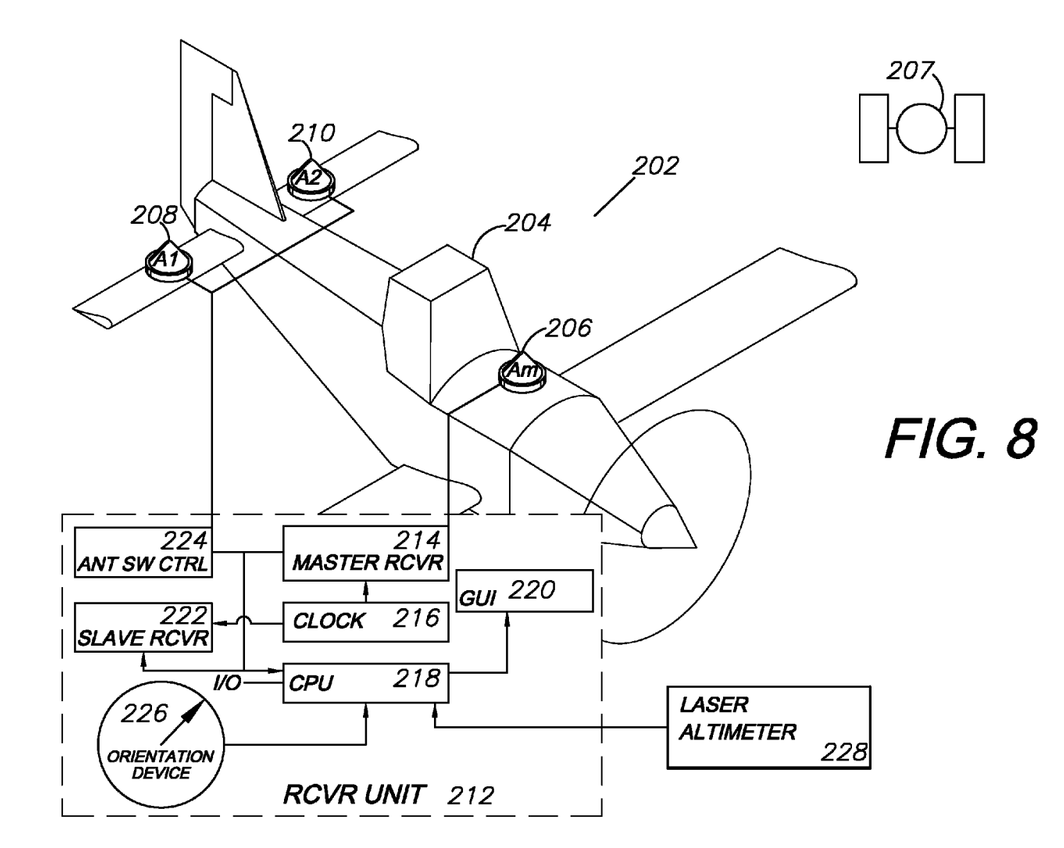

FIG. 6 is a top plan view of a crop-dusting aircraft 4 dusting a desired tract of land in parallel swaths. Contour or curved swaths can also be accommodated. For example, U.S. patent application Ser. No. 11/184,657 entitled Adaptive Guidance System and Method discloses accommodating various field configurations using straight-line (A-B) and contour swathing patterns, and is incorporated herein by reference. Tract border 46 information can be input to the CPU 18 of the crop dusting control system 2 pre-flight, and the gate controller 38 will shut the gate box assembly 36 when the CPU 18 determines that further dusting will fall outside of the border of the tract. The dusted rows 48 and the undusted rows 50 are displayed in FIG. 6 as well. The rows 56 will remain uniform as long as the pilot, or autopilot linked to the control system 2, guides the aircraft 4 along the displayed optimal path 52. Including topographical information from Google Earth allowing three-dimensional positional information can increase uniformity in applying materials. Certain areas may be designated as "no spray zones" 54 for a number of reasons, including crop differences, soil differences, property boundaries, moisture levels, wind drift concerns, livestock, bodies of water, roadways, etc. The spraying or dusting control system 2 can be programmed to discontinue material distribution during flyover of these particular areas. Additionally, several government agencies, such as the U.S. Forest Service and the U.S.D.A., are currently in the process of creating Google Earth files. The files being created by these agencies can be used to further designate "no spray zones" and help to define large areas where spraying or dusting is common while precisely delineating private and federally-protected lands.

Precise location and altitude variables are automatically obtained by the DGNSS portion of the crop dusting system 2, processed by the CPU 18, and instructions are automatically passed on to the gate box controller 38. Variables that are input into the system manually to increase accuracy and optimization include, but are not limited to, wind speed, material type, and the spread density required. Additionally, boundary information regarding the specific tract of land to be dusted must necessarily be defined to the CPU for it to determine when the gate must be closed and when it should be reopened. Such boundary information can also be acquired through connections with the Google Earth program, as described in more detail below. Alternatively, the gate controller may be controlled manually via the gate box control display 40.

A pre-planned path can be programmed into the CPU which defines where the aircraft 4 should fly. This pre-planned path can be based on only data points or it can be introduced through common mapping programs such as Google Earth, a product of Google Inc. of Mountain View, Calif. By creating new Google Earth files with positioning information, the CPU can take DGNSS position information of the aircraft and overlay that information onto the Google Earth map to determine precise positional information. The DNGSS control subsystem 9 is designed to interact with planned advances in Google Earth software that will allow positional data to include Z-axis topography to further optimize position tracking and field spraying. Thus, if the land below the aircraft varies in height, the aircraft can automatically adjust its altitude as need to avoid irregular field spraying or dusting.

The preferred embodiment of the present invention is designed to incorporate KML reference data used in conjunction with Google Earth. KML is a file format used to display geographic data in an Earth browser such as Google Earth and Google Maps. By using KML code, pilots or agricultural planners can use the Google Earth interface to add ground overlays, placemarks and other geographic data to the Google Earth interface, and save this as KML reference data which can then be shared with other pilots or agricultural planners for future use on a particular site. This reference data can then be incorporated into the pre-planned flight path over a particular tract of land. Alternatively, a map can be provided to the pilots via the GUI mentioned above wherein the Google Earth interface is overlaid with the flight plan and the pilot can visualize the flight pattern needed to cover the field.

Said pre-planned flight path can also be created based on imaging taken by the aircraft on previous flights. Image data can be geo-referenced automatically using a program like Google Earth. The user may then overlay flight path information or field data onto the digital map, or may place reference points directly into the program and export a data file that can be used to preload the CPU 18 with information pertinent to the job to be performed at the field site. This information may include flight path routes, water data, crop zone layouts, and where not to dump dry material on the ground below.

In another alternative use of the invention, the crop dusting control system 2 can be used to carry large amounts of water or chemicals, either solid or liquid, for the purpose of putting out large forest fires. Data from Google Earth created by such agencies as the U.S. Forest Service will allow such firefighting aircraft to quickly upload a pre-planned map of an area and even update that map with target fire-control zones. Since the system 2 can recognize data that already exist in a three-dimensional form within Google Earth, valuable time is saved, and highly precise flight plans can be created quickly and easily.

III. Alternative Embodiments

FIG. 7 is a block diagram showing a tank control system 102 comprising an alternative embodiment of the present invention. The relationship between the hopper 142, the gate box assembly 164, and the spreader 162 as defined above is modified with the addition of a sub-tank 104 located within a main tank/hopper 142. The sub-tank 104 can be filled with a concentrated chemical, whereas the main tank 142 can be filled with water for mixing with the concentrate in desired proportions. Both the internal sub-tank 104 and the hopper 142 feed into the gate box assembly, (or in the case of liquid application, into a sprayer assembly). The flow of material 108 and the flow of concentrated chemical 110 from the sub-tank 104 must pass through electrically controlled valves 106. These valves are electrically connected to the gate box controller 138, which determines how much of either product is introduced into the gate box assembly 164. Said gate box controller 138 is in constant communication with the GNSS CPU 118 and so gate box controls can be based off of positional information or other data known to the CPU. The concentrated solution mixes with the material from the hopper 142 inside the gate box assembly 164. The mixed material flow 112 is then passed along to the spreader 162. From here, the mixed material is discharged at 144. The advantages of such an embodiment are that the entire hopper load of spreading material, e.g. water, avoids contamination with chemical, and the entire hopper 142 does not have to be cleaned and sterilized of the chemical after the load is spread over a field. The sub-tank can be individually flushed or otherwise cleaned to remove chemical residue. Moreover, disposing of certain chemicals is regulated and involves significant expense, which can be minimized by isolating such materials in the sub-tank 104.

FIG. 8 shows an aircraft control system 202 comprising another alternative embodiment of the invention wherein a laser altimeter 228 is connected to an internal CPU 218 of a receiver unit 212. A GNSS receiver unit 212 is connected to antennas 206, 208, 210. As stated above, the slave antennas are optional, but additional antennas increase GNSS positional accuracy. A master rover receiver 214 and an optional slave rover receiver 222 receive positional data from the at least one antenna on the aircraft, as well as from an SBAS 207. A CPU 218 processes all information received by the master and slave rover receivers 214, 222 and compiles this data with information it receives from the laser altimeter 228 and other flight instruments. Through a combination of the clock 216, CPU 218, an orientation device 226, the laser altimeter 228, and other flight instruments, information is displayed to the pilot through the GUI 220 located in the cockpit of the aircraft 204. The GUI 220 provides information to the pilot graphically and allows the pilot to input commands directly into the GUI 220 which are read and processed by the CPU 218. The system 202 also includes an antenna switch control 224. A gate box control subsystem 11 such as that described above can optionally be utilized with the control system 204.

Although DGNSS systems are ideal and highly accurate when dealing with generally planar, two-dimensional coordinate systems, they are not as accurate when dealing with z-axis attitude for vehicles such as aircraft (e.g., X and Y). For this reason, altimeters are still used rather than relying on DGNSS alone. A laser altimeter 228 may be accurate to the centimeter level. Combining the altimeter 228 with the DGNSS system and a dual-frequency receiver such as the Eclipse receiver available from Hemisphere GPS can provide ideal approach vectors for use with the above-mentioned Google Earth mapping applications.

Using input variables such as wind speed, wind direction, desired spread density and material type, altitude, roll, pitch and yaw the crop dusting control system CPU 18 determines how much to open or close the gate box assembly 64. These variables, when changed, will also change the rate at which dry material must be dropped out of the plane. As the aircraft's flight path changes, the crop dusting control system 2 receives the constantly updating DGNSS data and the CPU 18 recalculates how open the gate box assembly 64 must be to maintain optimal material coverage. This same principal applies as the aircraft 4 approaches the tract border 46. For example, the faster the flight of the aircraft 4, the sooner the controller 18 must shut the gate box assembly 64. The inclusion of an optional laser altimeter 228 can enable more accurate flight plan following, for example using Google Earth information from planned future advances to include Z-axis topography, and allowing for a completely three-dimensional flight plan to be created prior to the aircraft taking off. Although the above generally represents an exemplary embodiment of the invention, it is to be understood that the invention can be embodied in various forms, and is not to be limited to the examples discussed above. For example, the system could be implemented to work with a material spreader designed for use with helicopter crop dusting equipment.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A global navigation satellite system (GNSS) based material distribution control system for a vehicle, which system comprises:
    a material hopper associated with the vehicle and adapted for containing a material to be distributed;
    a spreader mechanism adapted for spreading the material along a travel path of the vehicle;
    a gate box assembly connected to the hopper and the spreader mechanism;
    said gate box assembly being adapted for selectively controlling a flow of material from the hopper to the spreader mechanism;
    a GNSS subsystem mounted on the vehicle and including an antenna, a graphical user interface (GUI) and a GNSS receiver, said GNSS subsystem being adapted for providing GNSS-based positioning information for said vehicle;
    a gate box control subsystem including a controller connected to the GNSS subsystem and the gate box assembly and adapted for controlling said gate box assembly using said GNSS-based positioning information;
    a first computer having a processor and data storage;
    a second computer located at a remote location from the first computer, said second computer having a processor and data storage;
    said first computer being configured for storing field data from at least one predetermined location in said first computer data storage;
    said first computer being configured for analyzing said field data;
    said first computer being configured for generating a prescription plan for said predetermined location based upon the combination of said analysis and said field data;
    said first computer being configured for transmitting said prescription plan to said second computer; and
    said controller being configured to receive instructions from said second computer based upon said prescription plan.

* * * * *